July 22, 1969     G. KIRCHNER     3,456,289
APPARATUS FOR CALIBRATING THERMOPLASTIC TUBES
AND SIMILAR OBJECTS
Filed Jan. 17, 1967

INVENTOR

Georg Kirchner

United States Patent Office 3,456,289
Patented July 22, 1969

3,456,289
APPARATUS FOR CALIBRATING THERMOPLASTIC TUBES AND SIMILAR OBJECTS
Georg Kirchner, Jena, Germany, assignor to VEB Jenaer Glaswerk Schott & Gen., Jena, Germany
Filed Jan. 17, 1967, Ser. No. 611,216
Int. Cl. B29b 3/00; B29c 17/00
U.S. Cl. 18—1                          1 Claim

ABSTRACT OF THE DISCLOSURE

An apparatus for calibrating thermoplastic tubes comprises a stand, a table rotatably mounted on said stand, a pump, an inductive heating device, and calibrating mandrels on which thermoplastic tubes can be slipped. The mandrels are fitted in bores in the upper surface of the table. The heating device is a high-frequency generator to which a hairpin-shaped heating loop is electrically connected. The two limbs of the loop are parallel to each other and located on either side of the mandrels. These limbs are curved about the axis of rotation of the table and are inclined downward in the direction in which the rotating table causes the mandrels to travel.

---

This invention relates to apparatus for calibrating objects of thermoplastic material, particularly tubes for syringes.

In a known apparatus of the aforesaid kind, the tubes to be calibrated are slipped on calibration mandrels, sealed, evacuated and then continuously heated to plasticity by electrical or gas heated muffles, these muffles being continuously passed over the tubes, parallel to the axis thereof, until the plastic material has contacted the entire surface of the mandrels.

This known apparatus has the disadvantage that a muffle can only heat one tube at a time, it being impossible continuously to calibrate a plurality of such tubes in one operational pass. Another disadvantage consists in that the continuous displacement of each muffle along the direction of the respective tube axis requires its own driving mechanism.

The present invention aims at obviating the foregoing disadvantages by providing an apparatus for calibrating a plurality of thermoplastic tubes economically in one operational pass.

To this end the present invention accordingly consists in an apparatus for calibrating objects of thermoplastic material, particularly tubes for syringes, by means of calibrating mandrels which are fitted into bores in the upper surface of a rotary table and are heated together with the objects to be calibrated, characterised by an induction heating device made up of a high-frequency generator and a heating loop in the form of a hairpin. The limbs of this loop are interconnected by an arc-shaped portion and inclined downward in the direction of rotation of the table. This arrangement makes it possible for tubes slipped on the mandrels on the rotary table to be rotated through the said limbs in such a manner as to be heated to plasticity from above downward in the direction of their axes.

Figure 1:
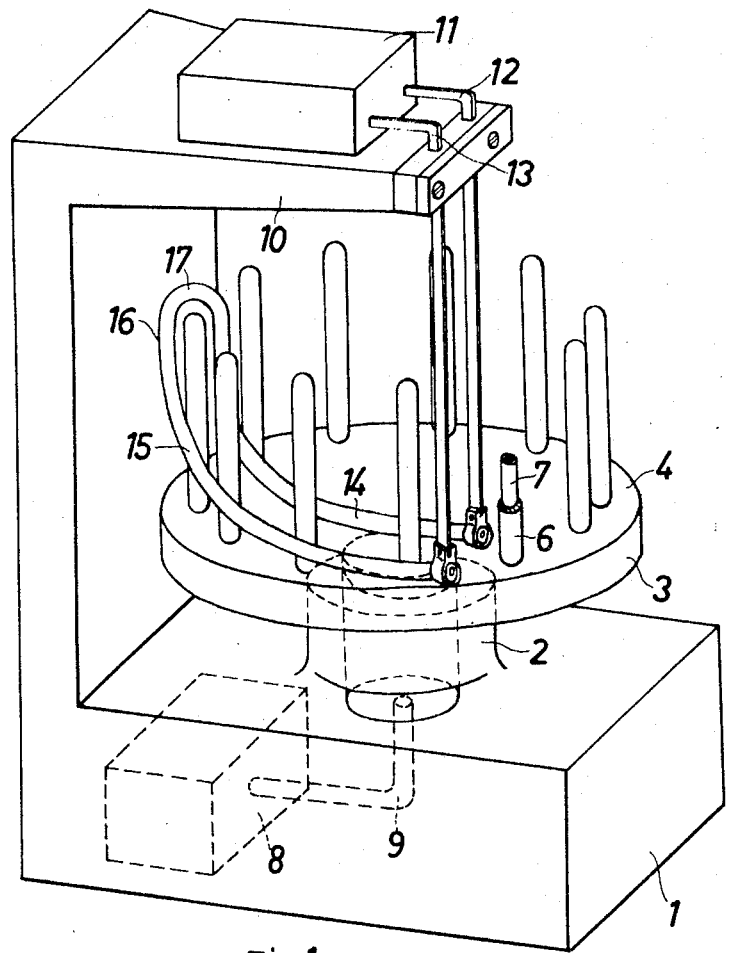
Figure 2:
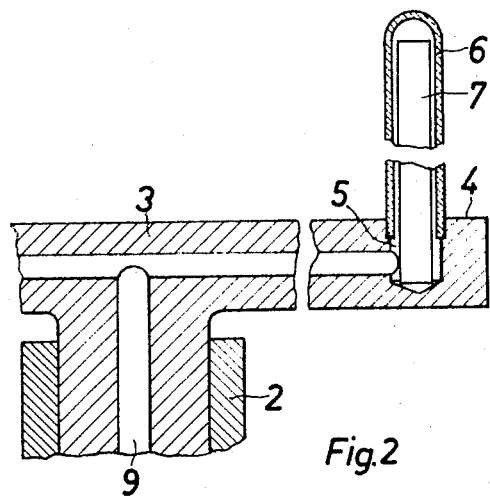

In order that the invention may be more readily understood, reference is made to the accompanying drawings which illustrate diagrammatically and by way of example the apparatus of the invention and in which FIG. 1 is a perspective view of the apparatus and
FIG. 2 shows a section through the rotary table and a mandrel with a tube slipped on it.

On the lower portion of a stand 1 is mounted a socket 2 which supports a table 3 rotatable by a driving mechanism (not shown). The upper surface 4 of the rotary table 3 contains a plurality of bores 5 arranged in a circle concentric with the axis of rotation of the table 3. The one ends of tubes 6 are slipped on calibrating mandrels 7 and are hermetically inserted with the mandrels 7 into the bores 5. The other ends of the tubes 6 are sealed. The lower portion of the stand 1 contains a vacuum pump 8 (shown only in part) which is connected with the bores 5 in the table 3 by means of a suction pipe 9. The pump 8 evacuates the clearance between the interior wall of the tubes 6 and the wall of the mandrels 7.

The upper portion 10 of the stand 1 carries a high-frequency generator 11 which by means of current-supplies 12 and 13 respectively connects with the two limbs 14 and 15 of a heating loop 16. The limbs 14 and 15 are interconnected by an arc-shaped portion 17. The heating loop 16 is secured to the upper portion 10 of the stand 1 by means not shown in the drawing.

Rotation of the table 3 causes the tubes 6 on the mandrels 7 to travel below the arc-shaped portion 17 of the heating loop 16 and between the parallel limbs 14 and 15, so that the tubes 6 and the mandrels 7 are heated in an alternating electromagnetic field from above downward along the direction of their axes. As the clearance between the interior surface of the tubes 6 and the surface of the mandrels 7 is evacuated, the atmospheric pressure causes the material of the tube 6, rendered plastic by the heat, to lie against the mandrels 7, so that the interior diameter of the tubes 6 is equal to the diameter of the mandrels 7.

I claim:
1. An apparatus for calibrating thermoplastic tubes sealed at their one ends, comprising
   a stand,
   a table rotating on said stand and having in its upper surface a plurality of bores of a diameter corresponding to the exterior diameter of the tubes to be calibrated,
      said bores being at equal distances from the axis of rotation of said table,
   a plurality of calibrating mandrels on which the tubes to be calibrated can be slipped,
      said mandrels being inserted from above in said bores,
   a vacuum pump connecting with the clearance between the interior surface of said tubes and the surface of said mandrels,
   and a heating device made up of a high-frequency generator and a heating loop,
      said loop being electrically connected with said generator and formed of two parallel limbs and a curved portion interconnecting said limbs in the form of a hairpin,
      said limbs being located on either side of said mandrels and curved about the axis of rotation of said table and being inclined downward to said table in the direction of rotation of same.

References Cited
UNITED STATES PATENTS
2,531,394  11/1950  Campbell _____ 65—292
2,684,556  7/1954   Molinari _____ 65—110

WILLIAM J. STEPHENSON, Primary Examiner

U.S. Cl. X.R.
18—19